United States Patent Office
3,455,892
Patented July 15, 1969

3,455,892
PROCESS FOR THE HARDENING OF GELATINE
Alfred Froehlich, Marly-le-Grand, Switzerland, assignor to Ciba Limited, Basel, Switzerland, a company of Switzerland
No Drawing. Filed Mar. 22, 1967, Ser. No. 625,032
Claims priority, application Switzerland, Apr. 12, 1966, 5,282/66
Int. Cl. C09h 7/00, 9/00; C08k 1/82
U.S. Cl. 260—117                                6 Claims

ABSTRACT OF THE DISCLOSURE

The present invention provides a process for the hardening of gelatine. It is especially useful for hardening gelatine in the form of photographic emulsion. The gelatine is reacted with a compound of formula

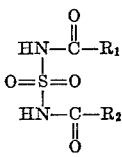

$R_1$ and $R_2$ may be identical or different from one another and represent radicals bound to the —CO-groups by a hetero-atom and capable of reacting with compounds containing mobile hydrogen atoms. The invention also provides the new compounds of the above formula.

DETAILED DESCRIPTION

The present invention provides a process for the hardening of gelatine which comprises reacting the gelatine, especially in the form of photographic emulsions, with a compound of formula (1) 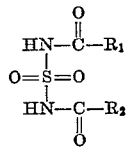

in which $R_1$ and $R_2$ each represents a residue bound to the —CO-group by a hetero-atom and capable of reacting with a compound containing one or more mobile hydrogen atoms to form one or more homopolar bonds.

The present invention also provides compounds of the above Formula 1.

The residues $R_1$ and $R_2$ of Formula 1 may preferably be identical but may also be different from one another. They are bound to the —CO-groups by a hetero-atom, that is to say by an atom other than carbon, which may be a ring member in a heterocyclic ring. As hetero-atoms there may be used, for example, sulphur atoms but especially oxygen and nitrogen atoms. In addition to this hetero-atom the residues $R_1$ and $R_2$ each contains the reactive part of the type described and various forms of bond between the latter and hetero-atom are possible. These residues, for example, each contain 1 to 12, preferably 2 to 6, carbon atoms. Thus the residues $R_1$ and $R_2$ consist of the reactive part (R') and the linkage member (X) which is between the latter and the —CO-group: X—R'. Residues having linkage members X of composition —O—$CH_2$— or —S—$CH_2$—, may be described as being ester-like, residues having X of formula —O—CO— as anhydride-like, those with X of formula —NA—$CH_2$ as amide-like and finally residues having X of formula —NA—XO— or —NA—$SO_2$— may be described as imide-like. Here A represents a hydrocarbon residue, for example, an alkyl residue having at most 4 carbon atoms or a phenyl residue, or preferably a hydrogen atom.

As regards the linkage members X, the compounds of formula (2) 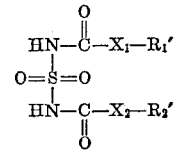

in which $X_1$ and $X_2$ each represents a grouping of formula —O—$CH_2$—, —NH—$CH_2$—,

—O—CO—

—NH—CO— and —NH—$SO_2$— and $R_1'$ and $R_2'$ each represents a residue capable of reacting with a compound containing one or more mobile hydrogen atoms to form a homopolar bond, are preferred.

As reactive residues $R_1'$ and $R_2'$ which are capable of entering homopolar bonds with nucleophilic reagents, for example, hydroxyl, sulphhydryl, primary or secondary amino groups or reactive methylene groups by addition or substitution reactions, there may be mentioned, for example, the residues of the following types of compounds: aldehydes, epoxy compounds, ethyleneimine compounds, N-heterocyclic halogen compounds with a reactive halogen atom in the $\alpha$-position to the nitrogen, aliphatic halogen compounds, $\alpha,\beta$-ethylenically unsaturated carboxylic acids, $\alpha,\beta$- or $\beta,\gamma$-ethylenically unsaturated sulphonic acids, $\alpha$- and $\beta$-halogenocarboxylic acids, $\beta$-hydroxysulphonates or -sulphates of aliphatic carboxylic acids, halides or anhydrides of carboxylic acids and halides of sulphonic acids.

Compounds of Formula 2 whose residues —$X_1$—$R_1'$ and —$X_2$—$R_2'$ correspond to one of the formulae

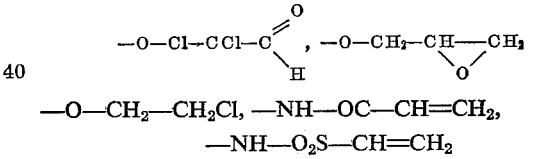

—O—$CH_2$—$CH_2Cl$, —NH—OC—CH=$CH_2$,

—NH—$O_2S$—CH=$CH_2$

—NH—OC—$CH_2Cl$, —NH—OC—$CH_2$—$CH_2Cl$ and —NH—OC—CHBr—$CH_2Br$, may especially be mentioned, for example, the compounds of formula (3) 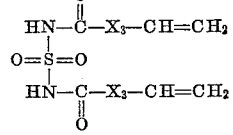

in which —$X_3$— represents an —NH—OC— group or an —NH—$O_2S$— group.

The compounds of Formula 1 may be manufactured by reacting sulphonyldiisocyanate in a molecular ratio of 1:2 with a compound containing a mobile hydrogen atom bound to a hetero-atom and a residue capable of reacting with a compound containing one or more mobile hydrogen atoms with the formation of a homopolar bond.

The sulphonyldiisocyanate which may be used as the starting material can be manufactured in a manner which is in itself known from chlorosulphonylisocyanate and silver cyanate according to the reaction equation (I) 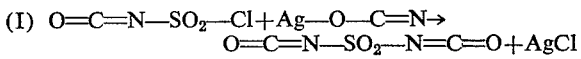

The manufacture of chlorosulphonylisocyanate is known.

Other compounds which may be used as starting materials are chosen according to the linkage member joined to the —CO groups and the reactive atom grouping.

Compounds of Formula 1 in which $R_1$ and $R_2$ each represents an aldehyde residue may, for example, be obtained by reacting an aliphatic or aromatic hydroxyaldehyde or an aminoaldehyde with sulphonyldiisocyanate in a molecular ratio of 2:1. Thus the compound of formula (4)
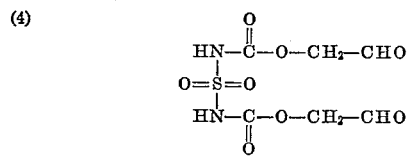

is obtained from 2 molecules of glycolaldehyde and 1 molecule of sulphonyldiisocyanate, or the compound of formula (5)
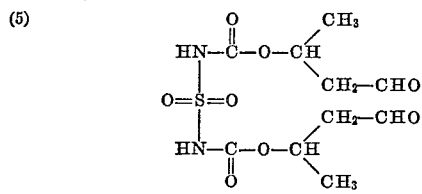

is obtained from aldol and sulphonyldiisocyanate.

Compounds of Formula 1 in which $R_1$ and $R_2$ each contains an epoxy residue may, for example, be obtained by reacting glycide with sulphonyldiisocyanate in a molecular ratio of 2:1.

(6)
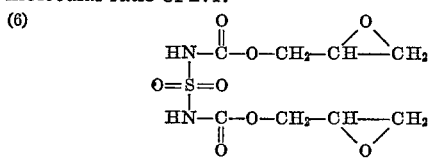

Compounds of Formula 1 in which $R_1$ and $R_2$ each contains an N-heterocyclic halogen compound may, for example, be obtained by reacting a suitable derivative of 2,3-dichloroquinazoline or of cyanuryl chloride with sulphonyldiisocyanate in a molecular ratio of 2:1; thus, for example, the Compound 7 is obtained:

(7)
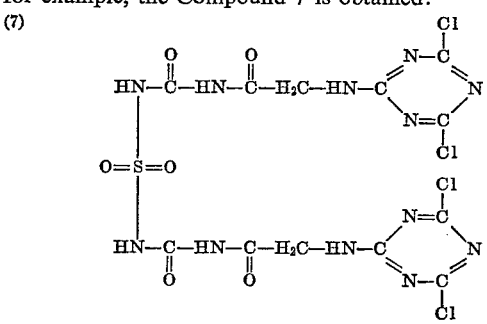

Compounds of Formula 1 in which $R_1$ and $R_2$ each contains an aliphatic halogen compound may, for example, be obtained from 2 molecules of ethylene chlorhydrin or bis -β-chlorethylamine and 1 molecule of sulphonyldiisocyanate:

(8)
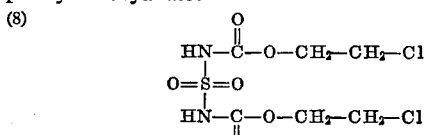

(9)
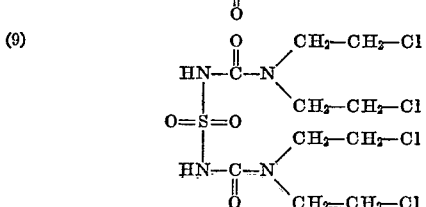

Compounds of Formula 1 in which $R_1$ and $R_2$ each represents a residue of an α,β-ethylenically unsaturated carboxylic acid with up to 4 carbon atoms, which is bound in an anhydride-like manner, are, for example, obtained by reacting 2 molecules of mucochloric acid or mucobromic acid with 1 molecule of sulphonyldiisocyanate:

(10)
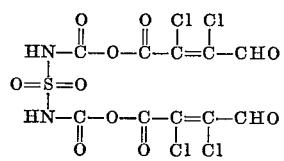

On the other hand, residues of such carboxylic or sulphonic acids which are bonded in an imide-like manner are produced on reacting the corresponding carboxylic or sulphonic acid amides with sulphonyldiisocyanate in a molecular ratio of 2:1. Thus, for example,

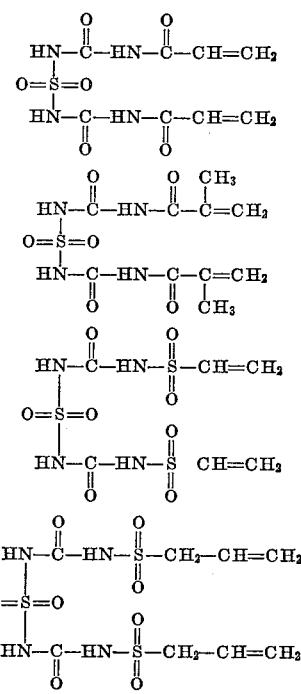

Compounds of Formula 1 in which $R_1$ and $R_2$ contain α- or β-halogenocarboxylic acid amide residues in which the halogen is, for example, chlorine or bromine, are produced in an entirely analogous manner; thus, for example,

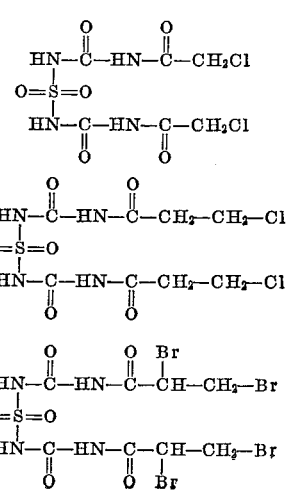

Finally it is, for example, possible analogously to produce the following:

(18) 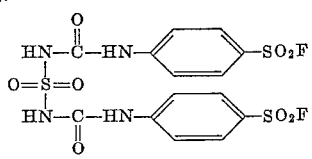

Compounds of Formula 1 in which $R_1$ and $R_2$ each contains a vinyl or acetylene group may, for example, be obtained by reacting allyl alcohol or allylamine with sulphonyldiisocyanate in a molecular ratio of 2:1.

(19) 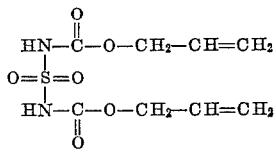

(20) 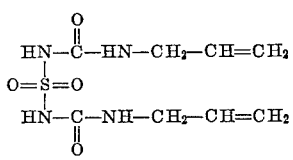

The stepwise reaction of sulphonyldiisocyanate with two different reactive compounds results in asymmetric compounds of Formula 1 for example, the following:

(21) 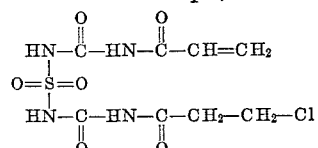

(22) 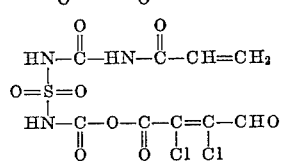

Sulphonyldiisocyanate is very reactive. Many of the reactions required to manufacture compounds of Formula 1 may therefore be carried out in the cold. In other respects the reactions may take place under the usual, and in themselves known, conditions for the reaction of isocyanates, for example, in the presence of an inert solvent and with the exclusion of moisture.

Compounds of Formula 1 may also be prepared by another method. Thus, it was found that sulphamide ($H_2N$—$SO_2$—$NH_2$) can be reacted with acylisocyanates in a molecular ratio of 1:2, in one or two reaction stages, under conditions which are otherwise analogous to those described above for sulphonyldiisocyanate. Accordingly, the compound of Formula 16 is, for example, also obtained as follows:

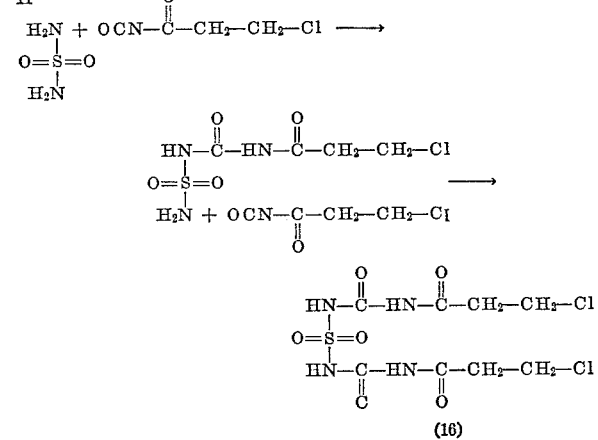

The acylisocyanates which may be used as the starting substances may be manufactured from an acid amide and oxalyl chloride. Other isocyanates, for example, isocyanates which can be manufactured in a known manner, for example, allyl isocyanate, may also be reacted with sulphamide by this method, giving the compound of Formula 20. Furthermore asymmetrical compounds may also be obtained, for example, the compound of formula

(23) 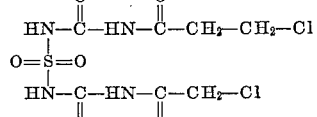

Finally chlorocarbonic acid esters or carbamic acid chlorides, for example,

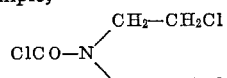

may also be reacted with sulphamide by a method which is in itself known.

On the other hand carbamic acid esters, for example, sulphonyl-bis-carbamic acid esters with lower aliphatic alcohols, are also suitable for reacting with residues $R_1$ and $R_2$ which contain amino groups.

Compounds of Formula 1 are, depending on the choice of the organic residues $R_1$ and $R_2$, suitable for linking together two identical or different reagents with the formation of homopolar bonds. Furthermore, by appropriately choosing the identical or different residues $R_1$ and $R_2$ with respect to the reagents which are to be linked to one another in a homopolar manner it is possible to incorporate such reactive groups $R_1$ and $R_2$ as can only be reacted under very specific and desired reaction conditions. Thus, for example, compounds of Formula 1 which contain aldehyde groups in the residues $R_1$ and $R_2$ can with monoalcohols or polyalcohols lead to acetal-like bonds. The same compounds can, for example, yield azomethines and methylol compounds with compounds which contain amino groups. The compounds of Formulae 4, 5 and II are especially suitable for cross-linking polymeric compounds containing amino and hydroxyl groups in a manner which is in itself known.

In an analogous manner, compounds of Formula 6, for example, give bis-ethers and bis-amines, and those of Formula 7, heterocyclic amino-compounds. In these cases again it is possible to cross-link polymeric compounds having hydroxyl or amino groups, as above.

In an entirely analogous manner the compounds of Formulae 6 to 18 react with reagents which contain hydroxyl, sulphhydryl and amino groups.

Some of the compounds of Formula 1, for example, those of Formulae 6, 11, 12, 13, 14, 19 and 20 are suitable for the manufacture of polymeric compounds. This can, for example, be carried out by self-polymerisation or by polymerisation with other ethylenically unsaturated compounds or by reaction with bifunctional derivatives with hydroxyl, sulphhydryl or amino groups.

The introduction of the sulphonyl-dicarbonamide structure of Formula 1 into organic compounds makes it possible for these compounds on addition of, for example, alkalis to go into solution in an aqueous medium within a defined pH range as a result of salt formation. Possible alkalis are, for example, hydroxides and carbonates of alkali metals, alkaline earth metals or ammonia. Organic amines with, for example, lower aliphatic residues may also be used. It is possible to eliminate 2 protons from compounds of Formula 1. This generally takes place in two stages:

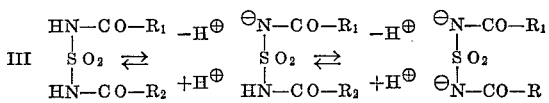

The first proton is generally eliminated in accordance with Equation III at about pH 6.5 and the second proton at about pH 9.

The especial advantage of the presence of this sulphonyldicarbonamide grouping in organic molecules is that the compounds can be manufactured in a very pure form in organic solvents and can, if required, also be still further purified by crystallisation from these, whilst the above mentioned grouping nevertheless confers water-solubility on the compounds of Formula 1 within the pH range of 6.5 to 12, preferably 6.5 to 9.5.

The compounds of Formula 1 may especially find application as cross-linking agents in the textile and leather industries, in paper manufacture, and in the plastics, adhesive and gelatine industries They are especially used as hardeners for gelatine, especially in photographic gelatine layers.

The reaction of the gelatine with a compound of Formula 1 generally takes place easily and in the usual manner. For example, an aqueous solution of the hardener may be added to the gelatine at a slightly elevated temperature, for example, up to about 60°, and the gelatine, which optionally contains silver halide and/or other materials for producing photographic images may be cast as a layer on a support in the usual manner and may optionally be dried. The layer may then be left at elevated temperatures for a certain time, for example, up to 24 hours, or may be left at room temperature. During this period, hardening takes place to an increasing extent and the melting point of the gelatine is significantly increased, for example, by 10° to 50° C. Depending on the temperature, the duration of action, the constitution and the amount of the hardener, the hardening achieved by reacting the compounds of Formula 1 with the gelatine may be greater or less. The amount of hardener relative to the amount of dry gelatine is appropriately within the range of from 0.5 to 5%. The hardening of the gelatine evidently is due to extensive cross-linking. At the same time these compounds, though they have no groups with strong water-solubilizing properties, for example, free sulphonic acid or carboxylic acid groups, are as a rule sufficiently water-soluble that they can be used as hardeners without special measures. They may be added to the gelatine in the form of aqueous solutions. The hardening of the gelatine by the present process impairs neither the photographic properties of the light-sensitive layers nor the reactivity of colour coupling agents or dyestuffs. The pH value and viscosity of the gelatine are also practically unaffected by the present hardeners.

The advantage of these hardeners for photographic gelatine, which should be stressed, is the possibility of using aqueous hardener solutions in the pH range of from 6 to 7.5.

It is also especially advantageous to be able to incorporate into the emulsion, by means of certain types of compounds of Formula 1, gelatine hardeners which exert their hardening effect almost instantaneously on coming into contact with the alkaline developer bath. This particular property is imparted by the sulphonyldicarbonamide structure, for example, of the compound of Formula 14. If this compound is dissolved in water at a pH value of 6.5 by appropriately adding alkalis, and this solution is added to a silver halide emulsion of the same pH value in the usual manner, then initially no perceptible increase in melting point occurs after casting, drying and storage. If such a cast layer is however treated in an alkaline developer bath, for example, at pH of at least 9.2, then hardening of the emulsion layer takes place instantaneously.

The retention of the cross-linking properties of these water-soluble hardeners in aqueous solution, which are preserved for a sufficiently long period of time despite the presence of the reactive groups, is especially valuable. Even after adding these hardener solutions to the ready-to-cast emulsions no unacceptable increase in viscosity as a result of incipient crosslinking takes place within a useful period of time, for example, from 4 to 6 hours. Nevertheless, considerable rises in melting point occur within a short time, for example, 12 to 18 hours, in the presence of the water-soluble colloids, on drying the cast emulsions to give thin layers of one to several $\mu$ thickness, despite the comparably low concentrations. This probably means that the reactivity of the gelatine hardeners only manifests itself at the amount of film formation of the water-soluble colloids.

As a result of the possibility of manufacturing compounds of Formula 1 with 2 different residues $R_1$ and $R_2$ which react with gelatine, in accoradnce with the process given above, it is, for example, also possible to select such residues $R_1$ and $R_2$ as are capable of reacting with gelatine under distinctly different reaction conditions.

Thus, for example, the compound of Formula 21 can, on the side which has the residue $R_1$, be made to react readily at a medium pH value, for example, within the range of from 6 to 7.5 whilst the residue $R_2$ only reacts spontaneously with gelatine at a higher pH value, for example, above 9. The most diverse derivatives of gelatine may be obtained in this way.

In the manufacturing instructions and the example which follow, the parts denote parts by weight and the percentages by weight. The ratio of parts by weight to parts by volume is the same as the ratio of g. to ml.

MANUFACTURING INSTRUCTIONS (A) A solution of 148 parts of sulphonyldiisocyanate in 500 parts of diethyl ether is slowly mixed, at —5 to 0° C., with a solution of 338 parts of mucochloric acid of formula HCO—CCl=CCl—COOH in 100 parts of diethyl ether. Thereafter the ether is distilled off and the residue is triturated with petrol. After removal of the petrol a colourless powder is obtained which melts at 120 to 122° C. with decomposition and is soluble in numerous organic solvents, for example in alcohol and in water to the extent of about 2%. The yield of reaction product of Formula 10 is about 100%. A sample recrystallised from water with the addition of activated charcoal melts at 124° C.

*Analysis.*—$C_{10}H_4O_{10}N_2Cl_4$. Calculated: C, 24.71; H, 0.83; N, 5.76; S, 6.60; Cl, 29.18. Found: C, 24.6; H, 1.1; N, 5.9; S, 6.6; Cl, 29.5.

(B) 71 parts of acrylamide are stirred with 2000 parts by volume of absolute diethyl ether. A solution of 74 parts of sulphonyldiisocyanate in 500 parts by volume of absolute diethyl ether is added dropwise to this suspension at —5° C., with stirring, and the mixture is stirred for a further 12 hours at room temperature. The colourless powder suspended in ether is now filtered off and dried in vacuo at 40° C. The compound of Formula 11 is obtained in a practically quantitative yield.

The product decomposes at 181° to 183° C., dissolves in water to the extent of about 0.5%, dissolves easily in aqueous alkalis, in which the pH value can be lowered to about 6.5 without resulting in precipitation, dissolves in acetone and ethanol with difficulty, and dissolves easily in dimethylformamide. It may be purified by dissolving 250 parts thereof at 55° C. in 300 parts by volume of dimethylformamide, filtering off small amounts of impurities if necessary, adding 500 parts by volume of ethanol, cooling indirectly with an ice/common salt mixture, filtering, washing the residue on the filter with 200 parts by volume of ethanol and then with 200 parts by volume of diethyl ether, and drying it in vacuo. About 200 parts of the purified product are obtained in the form of white crystals having an indefinite decomposition temperature of 186° C.

*Analysis.*—Calculated: C, 33.1; H, 3.47; N, 19.3; S, 11.05. Found: C, 33.3; H, 3.6; N, 19.4; S, 11.1.

The compound of Formula 11 may for example be polymerised as follows:

If a solution of 3 g. of the compound of Formula 11 in 10 ml. of dimethylformamide is warmed for 10 minutes on a boiling water bath, it is converted to a jelly. On trituration with methanol a white powder is obtained which is filtered off, washed with methanol and dried in vacuo at 30° C. This is insoluble in organic solvents and in water but swells in water at pH 9. The solubility can be increased by copolymerisation, for example with acrylonitrile. For this, 2.9 g. of the compound of Formula 11 are dissolved in 10 ml. of a mixture of 10 ml. of dimethylformamide and 2.2 g. of acrylonitrile and warmed for 10 minutes on a boiling water bath. The solution is converted to a light yellow highly viscous oil which is precipitated with 80 ml. of methanol, filtered and washed with methanol. After drying in vacuo at 30° C., 0.05 g. of the product give a clear solution in 2 ml. of water at pH 9. If the amount of acrylonitrile is, under otherwise identical conditions, increased to 4 g. and the product worked up as before, then a clear solution is obtained from 0.05 g. of substance and 2 ml. of water at pH 6.5. These polymers are valuable thickening agents.

(C) 9.24 parts of $\alpha,\beta$-dibromopropionic acid amide, which can be manufactured by a method known per se from dibromopropionyl chloride and ammonia, are suspended in 150 parts by volume of absolute diethyl ether. 3 parts of sulphonyldiisocyanate dissolved in 20 parts by volume of absolute diethyl ether are added dropwise to this solution at $-5$ to $0°$ C. After a short time a clear solution results which after about 3 hours turns cloudy, whereupon crystals begin to separate out. The mixture is stirred for 4 days at room temperature, and the product filtered and washed with diethyl ether. About 9.5 parts of the compound of Formula 17 are obtained in the form of colourless crystals of decomposition point 176° C. After recrystallisation from methanol the decomposition point is 182 to 183° C.

*Analysis.*—Calculated: C, 15.75; H, 1.65; N, 9.19; S, 5.26; Br, 52.41. Found: C, 16.1; H, 1.8; N, 9.2; S, 5.6; Br, 52.1.

(D) 4 parts of sulphonyldiisocyanate are dissolved in 50 parts by volume of absolute diethyl ether and a solution of 4 parts of glycide in 50 parts by volume of absolute diethyl ether is added dropwise at 0° C. After about 15 minutes the compound of Formula 6 precipitates as a colourless powder. The mixture is stirred for a further 2 hours at room temperature, filtered, and the product washed with ether. The yield is about 6.5 parts and the melting point 138° C. On distilling off the ether a further 1.3 parts of substance are obtained from the filtrate. The product is insoluble in ether and acetone and soluble in methanol with difficulty.

*Analysis.*—Calculated: C, 32.43; H, 4.08; N, 9.46; S, 10.82. Found: C, 32.5; H, 4.02; N, 9.6; S, 11.1.

(E) 18.6 parts of vinylsulphonic acid amide of formula $H_2C=CH-SO_2-NH_2$ are dissolved in 200 parts by volume of absolute diethyl ether. 7.4 parts of sulphonyldiisocyanate in 50 parts by volume of absolute diethyl ether are added dropwise to this solution. The mixture is stirred for 48 hours at room temperature, filtered, and the product washed with ether. After recrystallisation from methanol the compound of Formula 13 is obtained in the form of colourless crystals of decomposition point 150° C.

*Analysis.*—Calculated: C, 19.8; H, 2.8; N, 15.48; S, 26.5. Found: C, 19.5; H, 3.1; N, 15.6; S, 26.2.

(F) 18.7 parts of chlorethanol are dissolved in 50 parts by volume of absolute diethyl ether. A solution of 17.2 parts of sulphonyldiisocyanate in 50 parts by volume of absolute diethyl ether is added dropwise to this solution at 0 to 5° C. After a short time white crystals separate out. The product is stirred for a further 24 hours at room temperature, filtered off, and the product washed with ether. The resulting crystals, about 23 parts, are easily soluble in many organic solvents but soluble with difficulty in ether and insoluble in petrol. The compound corresponds to Formula 8. It may be recrystallised from water, in which it is fairly easily soluble. Melting point 225 to 228° C.

*Analysis.*—Calculated: C, 23.31; H, 3.26; N, 9.06; Cl, 22.94; S, 10.37. Found: C, 23.5; H, 3.3; N, 9.1; Cl, 23.4; S, 10.6.

(G) 17 parts of methacrylamide are suspended in 300 parts by volume of absolute diethyl ether, a solution of 14.8 parts of sulphonyldiisocyanate in 50 parts by volume of absolute diethyl ether is added dropwise at $-5°$ C., and the mixture stirred for 12 hours at room temperature. The compound of Formula 12 is obtained in quantitative yield in the form of a colourless powder. This is dried for one hour in vacuo at 70° C. The product melts at 195° C. with decomposition.

*Analysis.*—Calculated: C, 37.73; H, 4.43; N, 17.60; S, 10.1. Found: C, 38.0; H, 4.7; N, 17.5; S, 9.9.

(H) 9.35 parts of chloracetamide are suspended in 100 parts by volume of absolute diethyl ether and a solution of 7.4 parts of sulphonyldiisocyanate in 50 parts by volume of absolute diethyl ether is allowed to run in at a temperature of between 0 and 5° C. The mixture is stirred for 24 hours at room temperature and filtered, and about 9.5 parts of colourless crystals of Formula 15, of melting point 100 to 130° C., are obtained. These are triturated with 100 parts by volume of N hydrochloric acid, filtered and washed with 200 parts of water; melting point 180° C. (decomposition). In order to purify the substance, it is dissolved in 150 parts of water at pH 7, filtered, treated with 20 parts by volume of N hydrochloric acid, washed with water and then dried in vacuo at 40° C., as a result of which the decomposition point rises to 183° C.; the yield is then about 7.5 parts.

*Analysis.*—Calculated: C, 21.50; H, 2.41; N, 16.72; S, 9.57; Cl 10.86. Found: C, 21.4; H, 2.7; N, 16.8; S, 10.0; Cl, 10.9.

(I) 7.2 parts of $\beta$-chloropropionic acid amide are dissolved in 100 parts by volume of absolute diethyl ether. A solution of 4.9 parts of sulphonyldiisocyanate in 50 parts by volume of absolute diethyl ether is added dropwise at 0 to 5° C. The mixture is stirred for a further 24 hours at room temperature, the resulting crystals are filtered off, and the compound of Formula 16 so obtained is washed. The product melts at 177° C. with decomposition.

*Analysis* (without further purification).—Calculated: C, 26.46; H, 3.33; N, 15.43; S, 8.89; Cl, 19.52. Found: C, 26.8; H, 3.2; N, 15.0; S, 8.5; Cl, 19.1.

The chlorine atoms in this compound are very reactive and easily replaceable by other substituents. For example, 4 g. of the substance of Formula 16 are stirred with 30 ml. of methanol and 19 ml. of 0.5% strength sodium methylate solution for 2 hours at room temperature, filtered and washed with methanol. The residue is dissolved in 50 ml. of water, adjusted to pH 2 with hydrochloric acid, filtered, washed with water and dried in vacuo at 40° C. The compound decomposes at 155 to 158° C. and corresponds to the formula:

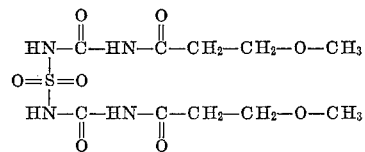

*Analysis.*—Calculated: C, 33.90; H, 5.08; N, 15.95; S, 9.15. Found: C, 33.70; H, 4.80; N, 15.90; S, 9.06.

A replacement by amino groups or sulphhydryl groups may be carried out analogously.

(K) 11.4 parts of allylamine are dissolved in 100 parts by volume of absolute diethyl ether. A solution of 14.8 parts of sulphonyldiisocyanate in 150 parts by volume of diethyl ether is added dropwise to this solution at $-10°$ C. The reaction product immediately separates out as a colourless powder. The mixture is stirred for a further 24 hours at room temperature, filtered, and the product washed with ether. Thereafter the compound of Formula 20 is recrystallised from methanol.

*Analysis.*—Calculated: C, 36.63; H, 5.38; N, 21.36; S, 12.22. Found: C, 36.7; H, 5.5; N, 21.6; S, 12.3.

(L) 14.8 parts of sulphonyldiisocyanate are dissolved in 170 parts by volume of absolute diethyl ether. The solution is cooled to −10° C. and a solution of 7.1 parts of acrylamide in 100 parts by volume of absolute acetonitrile is then added dropwise at this temperature during 1 hour. The mixture is stirred for a further 12 hours at room temperature and a clear solution is obtained. 10.8 parts of finely powdered β-chloropropionic acid amide are added to the clear solution. After a short time white crystals copiously separate out. The mixture is stirred for a further 24 hours, filtered, and the product washed with ether; about 27 parts of the compound of Formula 21 are obtained. The product is boiled with 100 parts by volume of acetonitrile and then filtered and washed with 200 parts by volume of acetonitrile. After recrystallisation from 600 parts by volume of acetonitrile the yield is still about 21 parts and the decomposition point 177 to 180° C.

*Analysis.*—Calculated: C, 29.41; H, 3.39; N, 17.15; S, 9.81; Cl, 10.85. Found: C, 29.6; H, 3.4; N, 17.1; S, 10.0; Cl 10.8.

(M) 7.4 parts of sulphonyldiisocyanate are dissolved in 85 parts by volume of absolute diethyl ether. A solution of 3.55 parts of acrylamide in 75 parts by volume of acetonitrile is added dropwise to this solution at −10° C. The mixture is stirred for 24 hours at room temperature and a clear solution is obtained. 8.4 parts of finely powdered mucochloric acid are introduced into this solution. After about 4 hours the compound of Formula 22 crystallises out. The mixture is stirred for a further 24 hours at room temperature, filtered, and the product washed with ether; in this way about 16.8 parts of this compound, which is very easily soluble in methanol and acetone, more easily soluble in acetonitrile and very slightly soluble in water, are obtained. In order to purify the substance, it is dissolved in hot aqueous methanol, water is added until crystallisation starts, the mixture is cooled and filtered, and the product washed with water and dried in vacuo at 40° C.

*Analysis.*—Calculated: C, 25.55; H, 1.88; N, 11.17; Cl, 18.85; S, 8.52. Found: C, 25.3; H, 1.8; N, 11.0; Cl, 18.7; S, 8.3.

(N) 4.8 parts of sulphamide ($H_2N$—$SO_2$—$NH_2$) are dissolved in 50 parts by volume of absolute acetonitrile and a solution of 14.7 parts of β-chloropropionyl isocyanate ($ClCH_2$—$CH_2$—CO—NCO) in 100 parts by volume of absolute acetonitrile are added thereto. The mixture is boiled for 2 hours under reflux. After a short time white crystals separate out. After cooling the compound of Formula 16 so obtained is filtered off and washed with acetonitrile and ether. About 16.7 parts of material of decomposition point 175° C. are obtained.

*Analysis.*—Calculated: C, 26.46; H, 3.33; N, 15.43; S, 8.83; Cl, 19.52. Found: C, 26.8; H, 3.5; N, 15.4; S, 8.8; Cl, 19.9.

The compound of Formula 11 is obtained by eliminating hydrochloric acid from the compound of Formula 16.

12 g. of the compound of Formula 16 are dissolved in 120 ml. of absolute triethylamine and stirred at room temperature. After about 5 minutes crystals separate out. The mixture is stirred for 12 hours, and the triethylamine hydrochloride which has separated out is filtered off and rinsed with a little acetone. The acetone mother liquor is distilled in vacuo at 25° C. bath temperature, and the residue is triturated with 30 ml. of water, then rendered acid to Congo red with hydrochloric acid and filtered. The product is rinsed with a little iced water and dried in vacuo at 25° C. After recrystallisation from methanol a decomposition point of about 186° C. is obtained.

*Analysis.*—Calculated: C, 33.10; H, 3.47; N, 19.30; S, 11.05. Found: C, 33.0; H, 3.3; N, 19.2; S, 11.0.

The product is identical with the product from Example 2, Formula 11.

(O) 6 parts of glycolaldehyde are suspended in 50 parts by volume of absolute ether and slowly treated at −10° C. with 7.4 parts of sulphonyldiisocyanate dissolved in 50 parts by volume of absolute ether. The mixture is stirred for 24 hours, filtered, and the product washed with ether. About 13.4 parts of the compound of Formula 4 are obtained in the form of colourless crystals which melt at 118 to 121° C. with decomposition.

*Analysis.*—Calculated: C, 26.87; H, 3.01; N, 10.45; S, 11.96. Found: C, 27.1; H, 3.3; N, 10.2; S, 11.7.

(P) 13.4 parts of aminoacetate-aldehyde-diacetal are dissolved in 50 parts by volume of absolute ether and treated at −10° C. with 7.4 parts of sulphonyldiisocyanate dissolved in 50 parts by volume of absolute ether. The mixture is stirred for 24 hours at room temperature and the ether then stripped off in vacuo at 25° C. bath temperature. The residue is triturated with water, filtered, washed with water and dried in vacuo at 25° C. After twice recrystallising from methanol the compound of formula

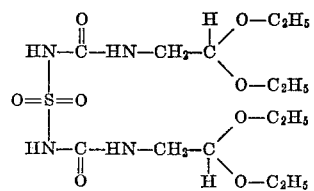

is obtained in the form of colourless crystals melting at 146° C.

*Analysis.*—Calculated: C, 40.57; H, 7.30; N, 13.52; S, 7.74. Found: C, 40.5; H, 7.4; N, 13.2; S, 7.4.

(Q) 8 parts of freshly distilled aldol dissolved in 50 parts by volume of absolute ether are first introduced and 7.4 parts of sulphonyldiisocyanate dissolved in 50 parts by volume of absolute ether are added dropwise at −10° C. The mixture is stirred for a further 24 hours at room temperature, the ether is decanted, and the residue is triturated four times with 50 parts by volume of ether at a time, filtered and washed with ether. The residue is triturated with 4 parts by volume of acetone and treated with 25 parts by volume of absolute ether. The product of Formula 5, which is initially honey-like, crystallises after a short time to give colourless crystals which decompose at 103° C.

(R) 23.2 parts of 3-hydroxymethyl-3-ethyl-1-oxacyclobutane are dissolved in 120 parts by volume of absolute ether; 14.7 parts of sulphonyldiisocyanate dissolved in 50 parts by volume of absolute ether are added dropwise thereto at −10° C. The mixture is stirred for a further 24 hours at room temperature, the compound of formula

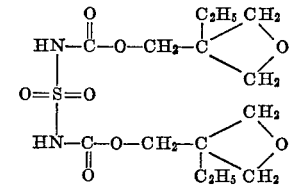

is filtered off, and the white crystals are washed with ether. These decompose at 139° C.

*Analysis.*—Calculated: C, 44.21; H, 6.32; N, 7.56; S, 8.42. Found: C, 44.5; H, 6.3; N, 7.1; S, 8.4.

(S) 9 parts of bis-(2-chorethyl)-amine hydrochloride are suspended in 50 parts by volume of absolute ether and 3.7 parts of sulphonyldiisocyanate dissolved in 50 parts by volume of absolute ether are added dropwise thereto at 0° C. The mixture is stirred overnight at room temperature, and the crystals are filtered off and washed with ether. The residue is triturated with 50 parts by volume of water, filtered off and washed three times with 50 parts by volume of water at a time. The product is dried in vacuo at 30° C. The compound of Formula 9, which is obtained in a crystalline form, decomposes at 108° C.

*Analysis.*—Calculated: Cl, 35.14. Found: Cl, 34.9.

(T) A solution of 14.8 parts of sulphonyldiisocyanate in 100 parts by volume of absolute ether is added dropwise to a solution of 6.9 parts of allyl alcohol in 100 parts by volume of absolute ether at −10° C. The mixture is stirred for a further 24 hours at room temperature and the ether then distilled off. The compound of Formula 19 obtained as a residue is recrystallised from a 1:3 alcohol-water mixture. Decomposition point 131° C.

*Analysis.*—Calculated: C, 36.36; H, 4.58; N, 10.60; S, 12.13. Found: C, 36.2; H, 4.7; N, 10.5; S, 12.3.

(U) 18.4 parts of cyanuryl chloride are dissolved in 200 parts by volume of absolute acetone and cooled to −10° C. 21.2 parts of anhydrous sodium carbonate and 7.8 parts of aminoacetamide are slowly added at this temperature, in such a way that the pH value is between 6 and 7. After it has all been introduced, the cooling bath is removed and the mixture is stirred for a further 2 hours, whereupon the temperature rises to 0° C. The product is filtered off and the filtrate evaporated to dryness in vacuo at 20° C. bath temperature.

11 parts of the product are recrystallised from 200 parts by volume of acetonitrile and 1 part of charcoal and are dried in vacuo at 40° C. Yield: 10 parts, melting point 194° C. with decomposition.

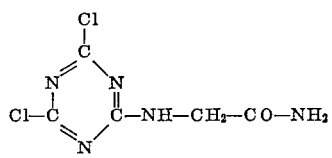

*Analysis.*—Calculated: C, 27.05; H, 2.27; N, 31.54; Cl, 31.39. Found: C, 27.3; H, 2.3; N, 31.5; Cl, 31.5.

3 parts of this product are dissolved in 150 parts by volume of absolute acetonitrile at 30–40° C., the mixture cooled to −10° C., and a solution of 1 part of sulphonyldiisocyanate in 20 parts by volume of acetonitrile is added dropwise with stirring. The mixture is stirred for a further 24 hours at room temperature and 75 parts by volume of acetonitrile are stripped off in vacuo at 30° C. bath temperature. The mother liquor is cooled in ice and filtered. A residue of 0.4 part remains and is discarded. The filtrate is evaporated to dryness in vacuo at 30° C. bath temperature and the residue is dried in vacuo at 40° C. Yield: 2.7 parts of the product of Formula 7, melting point 158° C. with decomposition.

*Analysis.*—Calculated: C, 24.30; H, 1.70; N, 28.29; Cl, 23.95. Found: C, 24.0; H, 2.2; N, 28.3; Cl, 23.7.

EXAMPLE

A 10% strength solution is prepared from one of the compounds of Formulae 4, 5, 6, 8, 9, 10, 11, 13, 15, 16, 17, 21, 22, 26 and the solvent specified in the table. The hardener solution is added, in amounts of 0.2 to 2 ml., to 20 ml. of a 10% strength aqueous solution of commercial gelatine suitable for photographic purposes which has been further diluted with 10 ml. of water, at 40° C.; the mixture is immediately poured on to a piece of film 18 cm. x 24 cm., allowed to solidify for 15 minutes and dried at normal atmospheric humidity for 24 hours at 38° C. with air circulation. Thereafter the film is left exposed to the atmosphere. The melting points are determined for the pieces of film dipped in tap water by slowly warming until the gelatine layer floats off. The results given in the following table were obtained in a series of experiments carried out in this way.

| Hardener Formula No. | Dissolved in— | Number of ml. of solution | Melting point after— | | | |
|---|---|---|---|---|---|---|
| | | | 24 hours' storage, °C. | 48 hours' storage, °C. | 8 days' storage, °C. | 18 days' storage, °C. |
| (6) | 1 g. in 4 ml. of dimethylformamide | 0.25 | 38 | | 48 | >95 |
| | | 0.50 | 38 | | 48 | >95 |
| | | 1.00 | 42 | | 87 | >95 |
| | | 2.00 | 45 | | 92 | >95 |
| (10) | 1 g. in 9 ml. of ethanol | 0.2 | 90 | | | |
| | | 0.4 | >95 | | | |
| | | 0.6 | >95 | | | |
| | | 0.8 | >95 | | | |
| (11) | 1 g. in 9 ml. of water at pH 6.5–7 | 0.2 | 43 | >95 | | |
| | | 0.4 | >95 | >95 | | |
| | | 0.6 | >95 | >95 | | |
| | | 0.8 | >95 | >95 | | |
| (13) | 1 g. in 9 ml. of water at pH 6.5–7 | 0.2 | 39 | | 41 | |
| | | 0.4 | 39 | | 52 | |
| | | 0.6 | 39 | | 91 | |
| | | 0.8 | 41 | | >95 | |
| (15) | 1 g. in 9 ml. of water at pH 6.5–7 | 0.2 | *73 | | | |
| | | 0.4 | 86 | | | |
| | | 0.6 | >95 | | | |
| | | 0.8 | >95 | | | |
| (16) | 0.5 g. in 4.5 ml. of dimethylformamide | 0.2 | *>95 | | | |
| | | 0.4 | >95 | | | |
| | | 0.6 | >95 | | | |
| | | 0.8 | >95 | | | |
| (17) | 1 g. in 9 ml. of water at pH 6.5–7 | 0.2 | 57 | 85 | | |
| | | 0.4 | 85 | 95 | | |
| | | 0.6 | 95 | 95 | | |
| | | 0.8 | 95 | 95 | | |
| (21) | 1 g. in 9 ml. of water at pH 6.5–7 | 0.2 | *89 | | 44 | |
| | | 0.4 | 91 | | 46 | |
| | | 0.6 | 92 | | 80 | |
| | | 0.8 | 94 | | 91 | |
| (22) | 1 g. in 9 ml. of water at pH 6.5–7 | 0.2 | 54 | 60 | | |
| | | 0.4 | 85 | 89 | | |
| | | 0.6 | 95 | 95 | | |
| | | 0.8 | 95 | 95 | | |
| (8) | 1 g. in 9 ml. of dimethylformamide | 0.2 | *73 | | | |
| | | 0.4 | 73 | | | |
| | | 0.6 | 74 | | | |
| | | 0.8 | 75 | | | |

See footnote at end of table.

| Hardener Formula No. | Dissolved in— | Number of ml. of solution | Melting point after— | | | |
|---|---|---|---|---|---|---|
| | | | 24 hours' storage, °C. | 48 hours' storage, °C. | 8 days' storage, °C. | 18 days' storage, °C |
| (5) | 1 g. in 9 ml. of water at pH 6.5 | 0.2 | *61 | | | |
| | | 0.4 | 82 | | | |
| | | 0.6 | 94 | | | |
| | | 0.8 | 95 | | | |
| (8) | 1 g. in 9 ml. of H₂O at pH 8 | 0.2 | 42 | | | |
| | | 0.4 | 53 | | | |
| | | 0.6 | 80 | | | |
| | | 0.8 | 89 | | | |
| (9) | 1 g. in 9 ml. of dimethylformamide | 0.2 | *44 | | | |
| | | 0.4 | 55 | | | |
| | | 0.6 | 78 | | | |
| | | 0.8 | 83 | | | |
| (26) | 1 g. in 9 ml. of water at pH 7 | 0.2 | *60 | | | |
| | | 0.4 | 62 | | | |
| | | 0.6 | 71 | | | |
| | | 0.8 | 73 | | | |
| (4) | 1 g. in 9 ml. of dimethylformamide | 0.2 | 42 | 43 | 50 | |
| | | 0.4 | 42 | 44 | 60 | |
| | | 0.6 | 43 | 86 | 95 | |
| | | 0.8 | 44 | 95 | 95 | |

* These melting points are obtained when the layers are immersed for 10 minutes at 20° C. in the following developer solution, then rinsed for 15 minutes and dried.

Developer solution:
Water _____ml__ 8,000
1 - methylamino - 4 - hydroxybenzene___g__ 30
Hydroquinone _____g__ 80
Anhydrous sodium sulphite _____g__ 345
Anhydrous sodium carbonate_____g__ 690
Potassium bromide _____g__ 25

I claim:
1. A process for hardening gelatine which comprises reacting gelatine with a compound of the formula

(1)
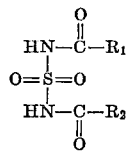

in which $R_1$ and $R_2$ each represents a radical bound to the —CO-group by a hetero-atom selected from the group consisting of oxygen, nitrogen, and sulphur and capable of reacting with a compound containing a mobile hydrogen atom to form a homopolar bond said $R_1$ and $R_2$ being the residues remaining after a hydrogen atom has been removed from compounds selected from the group consisting of aldehydes, epoxy compounds, ethyleneimine compounds, N-heterocyclic halogen compounds with a reactive halogen atom in the alpha position to the nitrogen, aliphatic halogen compounds, alpha, beta-ethylenically unsaturated carboxylic acids, alpha, beta- or beta, gamma-ethylenically unsaturated sulphonic acids, alpha- and beta-halogenocarboxylic acids, beta-hydroxysulphonates, or -sulphates of alpihatic carboxylic acids and halides of sulphonic acids.

2. The process according to claim 1 which comprises reacting gelatine with a compound of the formula (2)
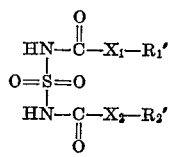

in which $X_1$ and $X_2$ each represents an atom grouping selected from the group consisting of —O—$CH_2$, —NH—$CH_2$, —O—CO—, —NH—CO— and
—NH—$SO_2$
and $R_1'$ and $R_2'$ each represents a radical capable of reacting with a compound containing a mobile hydrogen atom to form a homopolar bond said $R_1'$ and $R_2'$ being the residues remaining after a hydrogen atom has been removed from compounds selected from the group consisting of aldehydes, epoxy compounds, ethyleneimine compounds, N-heterocyclic halogen compounds with a reactive halogen atom in the alpha position to the nitrogen, aliphatic halogen compounds, alpha, beta-ethylenically unsaturated carboxylic acids, alpha, beta- or beta, gamma-ethylenically unsaturated sulphonic acids, alpha- and beta-halogenocarboxylic acids, beta-hydroxysulphonates, or -sulphates of aliphatic carboxylic acids and halides of sulphonic acids.

3. The process according to claim 1 which comprises reacting gelatine with a compound of the formula

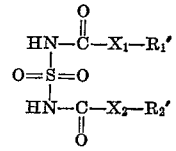

in which $X_1$—$R_1'$ and —$X_2$—$R_2'$ each represents a radical selected from the group consisting of the radicals
—O—OC—CCL=CCL—CHO,
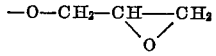
—O—$CH_2$—$CH_2$Cl, —NH—OC—CH=$CH_2$,
—NH—$O_2$S—CH=$CH_2$, —NH—OC—$CH_2$Cl,
—NH—OC—$CH_2$—$CH_2$Cl and
—NH—OC—CHBr—$CH_2$Br 4. The process according to claim 1 which comprises reacting gelatine with a compound of the formula

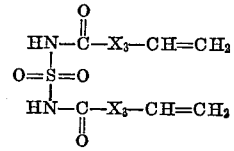

wherein —$X_3$— represents a member selected from the group consisting of the radicals —NH—OC— and
—NH—$O_2$S—

5. The process according to claim 1 which comprises reacting gelatine with the compound of the formula

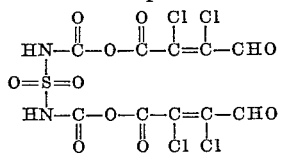

6. The process according to claim 1 which comprises reacting gelatine with the compound of the formula

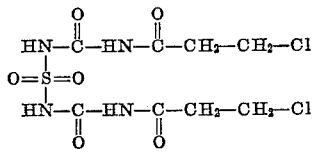

References Cited
UNITED STATES PATENTS

| | | | |
|---|---|---|---|
| 2,994,611 | 8/1961 | Heyna et al. | 96—111 |
| 3,132,945 | 5/1964 | Ryan | 96—94 |
| 3,061,436 | 10/1962 | Himmelman et al. | 96—94 |
| 3,128,184 | 4/1964 | Lowe et al. | 96—108 |
| 3,149,974 | 9/1964 | Claeys et al. | 96—111 |

HAROLD D. ANDERSON, Primary Examiner

H. SCHAIN, Assistant Examiner

U.S. Cl. X.R.

96—111; 260—249.5, 348, 481, 544, 546, 551, 553, 556